United States Patent [19]
Duyvesteyn et al.

[11] Patent Number: 5,441,712

[45] Date of Patent: Aug. 15, 1995

[54] HYDROMETALLURGICAL PROCESS FOR PRODUCING ZINC OXIDE

[75] Inventors: Willem P. C. Duyvesteyn, Reno, Nev.; Teun Bakker, Delft, Netherlands; Manuel R. Lastra, Antioch, Calif.

[73] Assignee: BHP Minerals International Inc., Sunnyvale, Calif.

[21] Appl. No.: 137,591

[22] Filed: Oct. 15, 1993

[51] Int. Cl.$^6$ .................. C01G 9/00; C01G 9/02; C22B 19/00; C01B 21/38

[52] U.S. Cl. .................. 423/99; 423/100; 423/390.1; 423/622; 423/DIG. 14

[58] Field of Search .......... 423/99, 100, 390.1, 423/622, DIG. 14

[56] References Cited

U.S. PATENT DOCUMENTS

| | | | |
|---|---|---|---|
| 2,737,445 | 3/1956 | Nossen | 423/390.1 |
| 3,666,446 | 5/1972 | Cook et al. | 423/100 |
| 3,958,986 | 5/1976 | Thorsen | 423/100 |
| 3,966,569 | 6/1976 | Reinhardt et al. | 423/100 |
| 4,125,587 | 11/1978 | Leimala et al. | 423/100 |
| 4,305,919 | 12/1981 | Roller | 423/392 |
| 4,401,531 | 8/1983 | Martin San Lorenzo et al. | 423/106 |
| 4,552,629 | 11/1985 | Duyvesteyn et al. | 423/100 |
| 4,572,771 | 2/1986 | Duyvesteyn et al. | 423/100 |
| 4,624,704 | 11/1986 | Byeseda | 423/100 |
| 5,084,180 | 1/1992 | Boateng | 423/100 |
| 5,229,003 | 7/1993 | Duyvesteyn | 210/638 |

*Primary Examiner*—Steven Bos
*Attorney, Agent, or Firm*—Hopgood, Calimafde, Kalil & Judlowe

[57] ABSTRACT

A hydrometallurgical process for producing zinc oxide from an aqueous solution containing zinc ions is provided. The process comprises the steps of contacting a zinc solution with an insoluble organic solvent selective to the extraction of zinc and thereby produce a zinc-loaded organic solvent. The zinc is then stripped from the zinc-loaded organic solvent with a solution of nitric acid to form a solution of zinc nitrate. The zinc nitrate solution is subjected to thermal hydrolysis at an elevated temperature in the presence of pressurized water vapor, the temperature being at least sufficient to decompose the zinc nitrate to zinc oxide which is thereafter recovered.

2 Claims, 1 Drawing Sheet

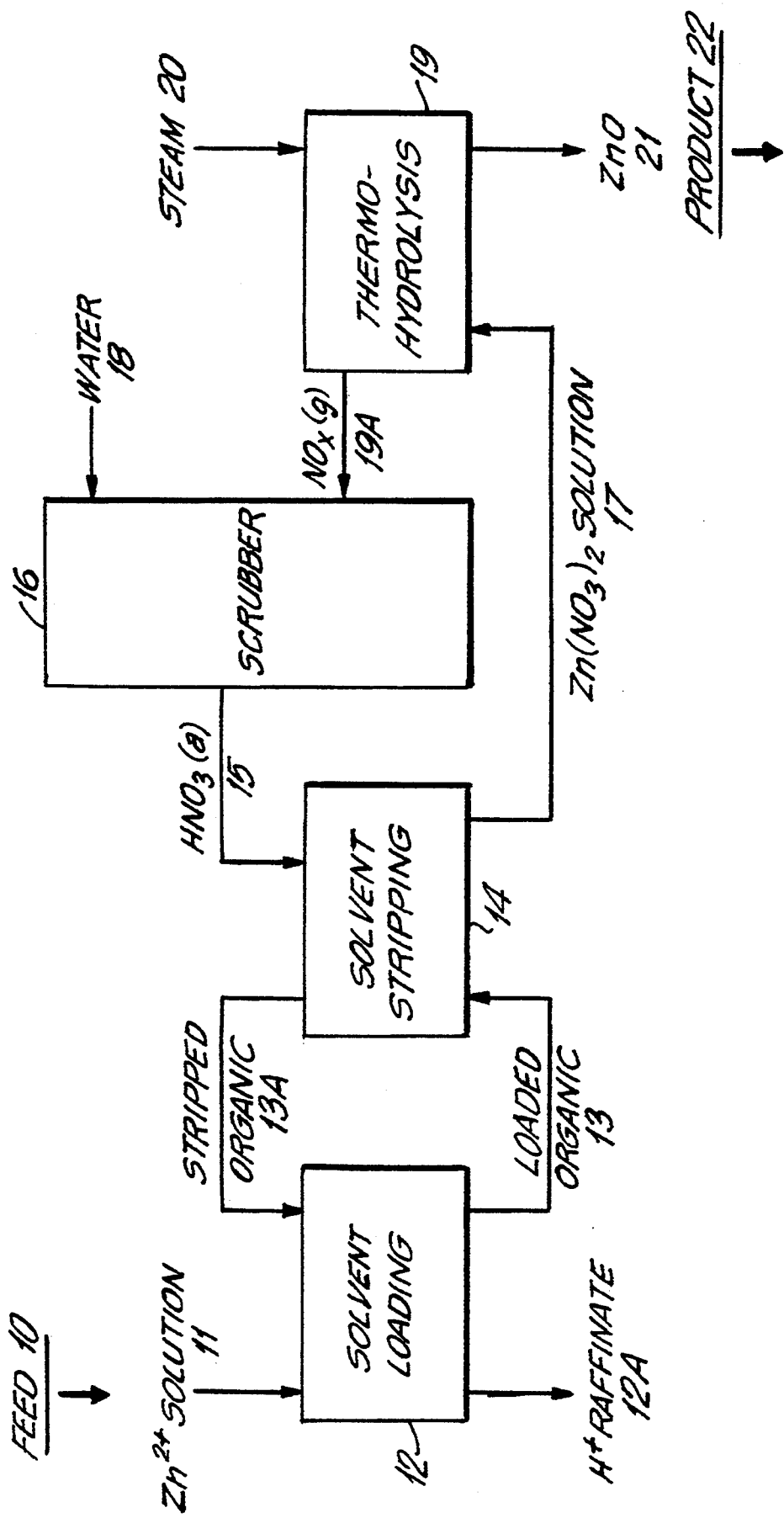

HYDROMETALLURGICAL PROCESS FOR PRODUCING ZINC OXIDE

This invention relates to the hydrometallurgical production of zinc oxide from zinciferous solutions.

STATEMENT OF THE ART

Several conventional processes are known for the production of zinc oxide by pyrometallurgy; these processes being known as the American and French processes, which processes are highly energy intensive.

In both processes, zinc oxide is manufactured by oxidizing zinc vapors in burners wherein the concentration of zinc vapor and the flow of air are controlled so as to develop the desired particle size and shape. The hot gasses and particulate oxide pass through coolers and then the zinc oxide is separated in a baghouse. The difference between the American and the French production method as well as the final purity of the zinc oxide depend on the source of the zinc fumes. The American process reduces high quality zinc calcines derived from concentrates to produce zinc vapor; whereas, the French process uses special high grade zinc metal that is heated to beyond its boiling point.

The zinc fumes in the American process are obtained by carbon reduction of impure zinc oxide feeds, which include oxidized and sulfidic zinc ores, residues, zinc-bearing iron ores and flue dusts, lead furnace slags, mill slimes, electrolytic-zinc leach residues, and ores of various other metals. Grate furnaces, rotary kilns, as well as electrothermic furnaces, are used. The furnace is charged with a mixture of the zinc-bearing material and a carbonaceous reductant, and is maintained in a reducing condition with carbon monoxide to produce zinc vapor. The vapor is drawn through a combustion chamber, where the zinc vapor is oxidized with air to produce particulate zinc oxide. The zinc oxide is separated from the gas stream in a bag house.

The purity of the directly produced oxide is somewhat difficult to control as it depends on the level of impurities in the feed material and the carbonaceous reductant.

The French process differs from the direct American process in that no reduction is necessary because high purity zinc metal, contrary to impure zinc oxide, is used and evaporated to produce the zinc vapor. In a similar fashion, like the direct American method, the vapor is burned and collected in a baghouse.

The purity of the zinc produced by the French method depends on the purity of the zinc metal which is much higher than the directly produced American zinc oxide. For high purity oxide special high grade zinc metal is used, but even secondary scrap zinc material is applied for lower grades.

In still another process, zinc carbonate can be precipitated from waste zinc solutions and by subsequent drying, calcining and grinding, a coarse zinc oxide can be produced. Another process involves the injection of powdered coal into molten blast furnace slag to reduce and evaporate the zinc present in the slag, which is referred to as the so-called slag fuming process. The vapors are oxidized to zinc oxide. The chemical quality of this zinc oxide is not always acceptable.

In U.S. Pat. No. 3,799,882, a process is disclosed for producing metal oxide directly from metal nitrate (e.g., zinc nitrate by thermal decomposition. According to one example in the patent, a zinc nitrate solution is absorbed onto a carbon felt material which is heated to 200° C. in air to produce a zinc oxide product in powder form, the carbon felt being completely oxidized.

In U.S. Pat. No. 3,886,258, a process is disclosed in which a slurry of hydrated zinc oxide is heated to at least 257° F. under pressure sufficient to prevent loss of water in the slurry and for a time sufficient to decrease the water of hydration content of the hydrated zinc oxide to enable the filtering of solids therefrom, including zinc oxide.

OBJECTS OF THE INVENTION

It is an object of the present invention to provide a hydrometallurgical process for producing zinc oxide from an aqueous solution containing zinc ions.

Another object is to provide a hydrometallurgical process for recovering zinc as zinc oxide from zinciferous materials, wherein the zinc is recovered from the zinciferous material in the form of an aqueous solution thereof and the zinc thereafter recovered from the aqueous solution hydrometallurgically as zinc oxide.

A further object is to provide a hydrometallurgical process for recovering zinc as zinc oxide from geothermal brines.

These and other objects will more clearly appear from the specification, the claims and the appended drawing.

BRIEF DESCRIPTION OF THE DRAWING

A flowsheet is provided illustrating one process for producing zinc oxide hydrometallurgically.

SUMMARY OF THE INVENTION

The present invention is directed to a hydrometallurgical process in which an aqueous solution of zinc is produced from a zinc source, which solution is thereafter mixed with substantially water-insoluble organic extractant specific to zinc to selectively extract the zinc from the aqueous solution. The organic extractant is dissolved in an appropriate water-insoluble diluent.

The organic extractant loaded with zinc is mixed with a solution of nitric acid to strip the zinc from the extractant, thereby generating an aqueous solution. The zinc nitrate solution is then subsequently heated in a substantially high water vapor pressure environment to temperatures above 200° C. to form by decomposition of the zinc nitrate a precipitate of zinc oxide along with gaseous nitric oxides.

Condensing water vapor formed during the process recombines with the gaseous nitric oxides to form nitric acid of acceptable strength for re-use to strip zinc from the zinc-loaded organic.

Stating it broadly, the hydrometallurgical process for producing zinc oxide comprises, contacting a zinc solution with a water-insoluble organic solvent selective to the extraction of zinc and thereby produce a zinc-loaded organic solvent. The zinc is stripped from the zinc-loaded organic solvent with a solution of nitric acid to form a solution of zinc nitrate, following which the zinc nitrate solution is subjected to thermal hydrolysis at an elevated temperature in the presence of pressurized water vapor, the temperature selected being at least sufficient to decompose zinc nitrate to zinc oxide, the zinc oxide being thereafter recovered, such as by filtration.

The zinc source may be an aqueous solution of, for example, zinc sulfate or zinc chloride obtained as a by-product in other metallurgical processes.

Or the zinc source may be a sulfide ore containing zinc sulphide which has been roasted at a controlled elevated temperature to the oxide state and then selectively leached with sulfuric acid to form an aqueous solution of zinc sulfate which is then employed in the process of the invention to produce by solvent extraction as an end product an aqueous solution of zinc nitrate, which solution is thereafter subjected to heat and pressure to decompose the zinc nitrate to zinc oxide.

The zinc source may be a geothermal brine containing zinc as zinc chloride or steel plant flue dusts containing substantial amounts of zinc.

Whatever the source of zinc, the zinc is recovered as an aqueous solution thereof, following which the aqueous solution containing the zinc is treated in accordance with the invention.

DETAILS OF THE INVENTION

The following equations illustrate the process of the invention in more detail, "R" being the organic part of the solvent RH.

$$Zn^{2+} + 2\ RH \rightarrow R_2Zn + 2\ H^+$$

For solvent stripping:

$$R_2Zn + 2\ HNO_3 \rightarrow Zn(NO_3)_2 + 2\ RH$$

in which RH represents the organic extractant in acid form. For the thermal hydrolysis or decomposition:

$$Zn(NO_3)_2 + H_2O \rightarrow ZnO + 2\ HNO_3$$

For the overall process:

$$Zn^{2+} + H_2O \rightarrow ZnO + 2\ H^+$$

The addition of water is necessary to provide the oxygen in the produced oxide and the hydrogen ions to keep the system neutrally charged.

THE SOLVENT EXTRACTION STEP

The first step in the proposed process is the selective extraction of zinc from a solution, which may along with zinc ions also contain several other constituents, by an organic extractant followed by stripping of the loaded organic with nitric acid, generating an aqueous zinc nitrate solution. As the objective of this solvent extraction step the following three purposes can be specified:
  i) transfer of zinc ions to the nitrate system.
  ii) removal of impurities by selective extraction of zinc.
  iii) concentration of zinc in zinc nitrate solution. The characteristics and composition of the aqueous feed solution will determine which organic extractant is best suitable to use for the extraction of zinc. For zinc several selective extractants are available. The selectivity for zinc will depend largely on the type of extractant, the pH of the aqueous feed, concentration of other ions present in the feed and the temperature. The extraction mechanisms of the different extractants are not identical. The following types of extractants can be distinguished.

Acidic Extractants

The ion is complexed with an ion of opposite charge, while replacing the water of hydration. Examples for zinc extraction of this group are the phosphoric (D2EHPA), phosphonic and carboxylic acids.

Basic Extractants

Formation of an ion-association complex, while replacing the water of hydration. The mechanism is based upon the difference of stability of the ion-association complex in the aqueous and organic phase. The extraction is anionic and anionic metal complexes are produced. Examples which can be selective for zinc are the primary, secondary and tertiary amines and the quaternary ammonium salts.

Solvating Extractants

Replacement of the water molecules by molecules of the solvent. Examples are several compounds with phosphorus-oxygen bonds such as tri-n-butyl phosphate (TBP) and trioctyl phosphine oxide (TOPO).

Chelating Extractants

Formation of a chelating complex with the zinc ion. Examples of this last group selective for zinc are 8-hydroxy quinolines and $\beta$-diketones.

Tests were carried out in order to illustrate that the transfer of zinc to the nitrate system by solvent extraction is possible. Continuous bench scale solvent extraction tests with an acidic extractant, Di-2-Ethyl-Hexyl-Phosphoric-Acid (D2EHPA), at 50 volume percent kerosene, yielded about 80% extraction of zinc from a synthetic zinc chloride solution with a zinc concentration of 8 g/l zinc in 2 extraction stages at pH 2.5. Stripping of the loaded organic in two stages with 200 g/l nitric acid, after a 2 stage water wash, resulted in a zinc nitrate solution containing about 50 g/l Zn.

Thermal Hydrolysis

The second step in the process is the thermal decomposition of the obtained zinc nitrate solution to zinc oxide and nitric acid. The latter can be reused to strip loaded organic extractant. The decomposition process consists of the following two steps:
  (A) The decomposition of the zinc nitrate solution at temperatures above 200° C. to zinc oxide and nitric oxide gasses.
  (B) Recovery of all the nitric oxide gasses in the form of nitric acid.

The thermal decomposition of metal nitrates has been reported. It has been indicated that zinc nitrate can be decomposed at 220°–225° C. to zinc oxide and nitric acid. Recoveries of 95–99% of nitric acid were reported. The presence of steam during the decomposition is important for optimum nitric acid recoveries. The zinc nitrate is reported to decompose to ZnO and $N_2O_5$, which is unstable. In the presence of steam $N_2O_5$ combines with water in an exothermic reaction to form nitric acid. If no steam is present $N_2O_5$ will decompose to form $N_2O_4$ which may transform to $NO_2$. Another source states that zinc nitrate as a compound has a melting point of 36.4° C. and boils after dehydration in the range of 105°–131° C.

Decomposition tests of both synthetic zinc nitrate solution and the solution produced in continuous bench scale solvent extraction tests showed that the decomposition to zinc oxide is possible, while recovering the nitrates as nitric acid. The tests were done in a rotary kiln, into which the zinc nitrate solution at 50 g/l Zn was fed. At temperatures as low as 170° C. a precipitate started forming. X-Ray diffraction analysis of the precipitate confirmed the formation of zinc oxide. Due to the continuous feeding of the zinc nitrate solution a high water vapor pressure could be maintained during the decomposition. A scrubber recovered 95-99% of nitric acid from the gasses leaving the furnace. A relatively coarse, yellow-zinc oxide material was produced.

The mechanism of the decomposition process is postulated as follows: At first the evaporation of a water-nitric acid mixture takes place. When the concentration of zinc nitrate reaches the solubility product of $Zn(NO_3)_2$, liquid zinc nitrate will form. This liquid zinc nitrate decomposes to zinc oxide and nitrogen gasses (probably $N_2O_5$). The presence of steam generated by the evaporation of the water present, converts $N_2O_5$ into nitric acid, which can be recovered by a condenser or scrubber.

The reported temperature of 220°-225° C. is not an absolute minimum temperature for the reaction to take place, but it represents the temperature at which a reasonable decomposition rate is obtained. This rate is also dependent on the concentration of zinc in the hydrolyzer feed solution, because this will determine the amount of water which has to be evaporated. Accordingly, the optimization criterion for the process will be to yield as high as possible zinc concentration in the zinc nitrate solution.

The Advantages of The Invention

There are a number of features that differentiates the process of the invention from other processes for zinc oxide production.

1. Any raw material, irrespective of impurities, which can be leached to produce zinc ions in solution, will produce an ultra high purity zinc oxide.
2. Zinc oxide produced by thermal hydrolysis has different physical specs compared to oxide from zinc fumes. It is believed that it has the ideal specifications for zinc oxide for use as a rubber vulcanizer retardant.
3. The process of the invention is a hydrometallurgical process that excludes the energy intensive zinc metal preparation step used in other commercial processes. The only energy required is for the evaporation of the zinc nitrate solution. The pilot plant work employed a complete cycle with nitric acid regeneration. Further energy savings are possible if a solution concentration step is used between the SXC stripping and hydrolysis steps, such as crystallization and reverse osmosis.
4. Complete recycle of nitric acid solution can be accomplished. This can not be achieved with sulfuric acid in which the formed $SO_3$ decomposes into $SO_2$ and $O_2$. The strength of the nitric acid solution required for solvent stripping is more or less what is produced in the acid regeneration step.

As illustrative of the invention, the following examples are given:

EXAMPLE 1

A solution of zinc sulfate is produced by leaching an ore of zinc sulfide concentrate which is first roasted in an oxidizing environment to provide a roasted product of zinc oxide containing about 2.5-15% zinc. The roasted ore is then leached with an acid comprising 15 gpl of sulfuric acid, the ratio of the ore to the leach solution being such as to produce a zinc sulfate solution containing 8 gpl of zinc as zinc sulfate, the pH ranging from about 2 to 3.

The zinc sulfate solution is used as feed for the recovery of zinc therefrom as shown in the accompanying flow sheet.

Referring to the flow sheet, the feed solution 10 containing $Zn^{2+}$ ions 11 is fed to the solvent loading stage 12 of the flow sheet where it is mixed with the organic extractant containing 50% by volume of D2EHPA [i.e., di-(2 ethylhexyl) phosphoric acid] and 50% by volume of kerosene, the ratio of the zinc-containing solution to the solvent extractant being such as to provide a loaded organic containing about 3 gpl to 4 gpl of zinc and a raffinate 12A containing hydrogen ions.

The zinc-loaded organic 13 is fed to the solvent stripping stage 14 where it is mixed with recycle nitric acid 15 obtained from scrubber 16 to form a zinc nitrate solution by virtue of water 18 being fed to scrubber 16 to form nitric acid by combining with $NO_x$ (g) 19A formed during thermo-hydrolysis at stage 19.

In the meantime, the stripped organic 13A obtained at the solvent stripping stages 14 is fed back to the solvent loading stage 12.

Steam 20 is fed to stage 19 to provide a rotary, spray or tube dryer while the zinc nitrate solution 17 is being subjected to thermo-hydrolysis at a temperature of at least about 170° C. and not exceeding about 300° C., generally about 200° C. to about 230° C., e.g., about 220° C. to 225° C.

During thermo-hydrolysis at stage 19, zinc oxide 21 is formed to provide a final product 22.

As shown in the flow sheet, the process may be carried out continuously.

EXAMPLE 2

The invention is also applicable to the recovery of zinc from zinc brine, that is, zinc solution containing zinc chloride.

One kind of brine solution containing zinc chloride is the type referred to as geothermal brines. A well known geothermal brine containing zinc chloride is one which exists subterraneously in the Imperial Valley of California from which electrical power is generated by using the intrinsic heat of the pressurized brine which is brought to the surface and flashed into steam which is used to generate power.

Two fields are known, to wit: the Imperial Field and the Salton Sea Field. An analytical comparison of flashed brines from each field of zinc and other elements is given in parts per million in the following table.

| Element, ppm | Imperial Field | Salton Sea Field |
| --- | --- | --- |
| Gold | NA | 0.02 |
| Silver | 2.6 | 0.5 |
| Zinc | 1500 | 500 |
| Lead | 650 | 110 |
| Lithium | 250 | 280 |
| Strontium | 1500 | 620 |
| Manganese | 1000 | 1200 |
| Platinum | NA | 0.06 |
| Sodium | 50,000 | 57,000 |
| Calcium | 18,000 | 26,000 |
| Potassium | 10,000 | 15,000 |
| Iron | 3,200 | 1,800 |
| Barium | 2,000 | 600 |
| Boron | 220 | 360 |
| Chloride | 131,000 | 160,000 |

As will be noted, the zinc in the geothermal brine derived from the Imperial Field is three times higher than the zinc in the Salton Sea Field.

The extraction of zinc from an aqueous solution, such as zinc sulfate or zinc chloride solutions, may be carried out by using either an anionic organic extractant or a cationic organic extractant. The anionic extractant may be an organic solvent selected from the group consisting of secondary, tertiary and quaternary amines.

The cationic organic extractant may be selected from the group consisting of mono-(2-ethylhexyl) phosphoric acid, di-(2-ethylhexyl) phosphoric acid, mono-(2-ethylhexyl) phosphonic acid, di-(2-ethylhexyl) phosphonic acid, di-(2,4,4-trimethylpentyl) phosphinic acid and di-(2-ethylhexyl) phosphinic acid.

The extractants are generally employed with diluents. Typical diluents are organic solvents including kerosene, aliphatic and aromatic organic solvents.

The anionic solvent is either a secondary amine of the general formula $R^1R^2NH$ or a tertiary amine of the general formula $R^1R^2R^3N$ in which $R^1$ is any one of $C_3H_7(CH_2)_5$; $CH_3(CH_2)_7$; $CH_3(CH_2)_9$; $C_2H_5(CH_2)_7$; $CH_3(CH_2)_{11}$; $CH_3(CH_2)_{12}$ or $C_9H_{19}.C_3H_4$; $R^2$ is any one of $C_3H_7(CH_2)_5$; $CH_3(CH_2)_7$; $CH_3(CH_2)_9$; $C_2H_5(CH_2)_7$; $CH_3(CH_2)_{11}$; $CH_3(CH_2)_{12}$ or $CH_4H_9.C_6H_{10}$; and $R^3$ is any one of $C_3H_7(CH_2)_5$; $CH_3(CH_2)_7$; $CH_3(CH_2)_9$; $C_2H_5(CH_2)_7$; $CH_3(CH_2)_{11}$; or $CH_3(CH_2)_{12}$.

One type of secondary amine is that sold under the trademark Amberlite LA-2 (Rohm and Haas) comprising $CH_3(CH_2)_{11}.C_4H_9C_6H_{10}.NH$. Another secondary amine is one referred to as Adogen 283 comprising $CH_3(CH_2)_{12}.CH_3(CH_2)_{12}.NH$. A tertiary amine referred to as Alamine 336 comprises $CH_3(CH_2)_7.CH_3(CH_2)_7.CH_3(CH_2)_7N$.

Another tertiary amine referred to as Adogen 381 comprises $C_3H_7(CH_2)_5.C_3H_7(CH_2)_5.C_3H_7(CH_2)_5N$.

When employing an anionic solvent from the group consisting of secondary, tertiary and quaternary amines, organic phase modifiers may be added selected from the group consisting of isodecanol, tributyl phosphate ester, trioctyl phosphine oxide, tri-isobutyl phosphine sulfide and isobutyl methylketone.

The extraction of zinc from geothermal brines is disclosed in copending U.S. application Ser. No. 763,446, filed Sep. 19, 1991 now U.S. Pat. No. 5,229,003, the disclosure of which is incorporated herein by reference.

As illustrative of another embodiment of the invention, the following example is given:

EXAMPLE 3

A postflashed geothermal brine solution is provided containing, among other metal values, about 1.8 gpl zinc as zinc chloride. The brine is subjected to solvent extraction to recover the zinc using an anionic secondary amine of the general formula $R^1R^2NH$, more specifically N-dodecyl-1,1,3,3,5,5-hexamethyl hexyl amine sold under the trademark Amberlite LA-2 or a tertiary amine of the general formula $R^1R^2R^3N$ sold as troctylamine under the trademark Alamine 336.

About 147 mls of the brine is mixed with about 210 mls of an organic phase containing 7.5% of the aforementioned secondary amine, the two solutions being mixed in a multi-stage countercurrent solvent extraction circuit for about 3-5 minutes, per stage, with the extraction temperature ranging from about 47° C. to 58° C.

The mixture is then allowed to separate into two layers and the spent brine removed to provide a zinc loaded anionic extractant.

The zinc loaded anionic extractant is stripped with water at a volume ratio to produce a zinc chloride solution containing about 5 gpl of zinc.

The zinc chloride solution is then subjected to a cationic extractant (Di-2-ethylhexyl phosphoric acid) D2EHPA (50%) and 50% kerosene to produce a loaded solvent containing about 5 gpl zinc. An O/A ratio of about one is employed to produce a raffinate containing less than 0.05 gpl zinc. The loaded organic is contacted with a 200 gpl $HNO_3$ strip solution with O/A ratio of ¼ to produce a zinc nitrate solution containing 30 gpl zinc and about 150 gpl HNO.

The zinc nitrate solution is thereafter subjected to thermo-hydrolysis at a temperature in the range of about 200° C. to 230° C. as in Example 1 to produce a zinc oxide which is thereafter separated from the solution.

Another source of zinc may be steel plant dusts.

The zinc maybe recovered as zinc oxide in accordance with the following example.

EXAMPLE 4

Steel plant dusts are a good source of zinc. In this connection, reference is made to U.S. Pat. No. 4,610,721 which issued on Sep. 9, 1986 in the name of Willem P. C. Duyvesteyn. The disclosure of this patent is incorporated herein by reference.

A typical flue dust is one containing about 20% to 60% iron, about 5% to 40% zinc and about 0.5 to 6% lead and the balance oxides of residual metals. Thus the flue dusts may also contain substantial amounts of other metals, such as oxides of calcium, manganese, silicon, magnesium, aluminum, etc.

A particular composition is the following:

TABLE 1

| Element | wt. % |
| --- | --- |
| Iron | 27.8 |
| Zinc | 25.8 |
| Lead | 3.03 |
| Cadmium | 0.041 |
| Calcium | 6.07 |
| Manganese | 3.12 |
| Silicon | 2.47 |
| Aluminum | 0.57 |
| Copper | 0.16 |
| Chlorine | 3.3 |
| Fluorine | 1.1 |
| Potassium | N.A. |
| Sodium | N.A. |
| Magnesium | N.A. |

About 200 grams of flue dust is slurried with 800 ml of water to provide a pulp density of 20% by weight. The pulp is heated to about 75° C. and concentrated sulfuric acid is added to provide a pH of about 2 for selectively leaching the zinc while inhibiting the dissolution of iron. The filtrate contains 52 gpl zinc and 0.18 gpl iron, the zinc being present as zinc sulfate.

About 214 ml of the zinc sulfate solution is contacted with 220 ml of the organic extractant 7.5% DEHPA and 92.5% kerosene for a time sufficient to extract substantially all of the zinc and provide a zinc-loaded extractant.

About 220 ml of the loaded extractant is contacted with 33 ml of a nitric acid solution containing 200 gpl of nitric acid for a time sufficient to extract substantially all of the zinc from the loaded organic extractant.

The zinc nitrate solution is then subjected to thermohydrolysis at about 220° C. to produce zinc oxide as described hereinbefore.

By maintaining the pH of the leach solution during leaching of the flue dust to about 2 to 3, the iron in the flue dust is substantially inhibited from dissolving in the sulfuric acid along with the zinc. Thus, at a pH of 2, the final leach solution contains 0.18 gpl iron, while at a pH of 3, the amount of iron in the leach solution is only 0.07 gpl.

Thus, regardless of the source of zinc, the zinc can be extracted from the source by known methods as an aqueous solution, for example, as zinc sulfate or zinc chloride solutions, which solutions are thereafter treated in accordance with the invention using the flow sheet herein as one embodiment for producing zinc oxide.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A hydrometallurgical process for recovering zinc from a zinc-containing brine in the form of substantially pure zinc oxide which comprises:

contacting said zinc-containing brine with a water-insoluble anionic organic solvent selective to the extraction of zinc to produce a spent brine and a zinc loaded anionic organic solvent, said anionic organic solvent being selected from the group consisting of secondary, tertiary and quaternary amines, selectively extracting zinc from said zinc loaded anionic organic solvent by contacting with water to produce an aqueous solution of zinc chloride, extracting zinc from said aqueous solution of zinc chloride by contacting with a cationic organic solvent selective to the extraction of zinc, to produce a zinc-loaded cationic organic solvent, said cationic organic solvent being selected from the group consisting of mono-(2-ethylhexyl) phosphoric acid, di-(2-ethylhexyl) phosphoric acid, mono-(2-ethylhexyl) phosphonic acid, di-(2-ethylhexyl) phosphonic acid, di-(2,4,4-trimethyl-pentyl) phosphinic acid and di-(2-ethylhexyl) phosphinic acid, stripping said zinc from said zinc-loaded cationic organic solvent by contacting with nitric acid to form an aqueous solution of zinc nitrate in a solvent stripping stage, subjecting said zinc nitrate solution to thermal hydrolysis at an elevated temperature ranging from about 150° C. to 300° C. in the presence of pressurized water vapor, to decompose zinc nitrate to zinc oxide and to produce an acid-forming nitric oxide gas, recovering said zinc oxide, passing said acid-forming nitric oxide gas to a water scrubber to form nitric acid, and recycling said nitric acid to said solvent stripping stage.

2. A hydrometallurgical process for recovering zinc from a zinc-containing geothermal brine in the form of substantially pure zinc oxide, which comprises:

contacting said zinc-containing geothermal brine with a water-insoluble anionic organic solvent selected from the group consisting of secondary, tertiary and quaternary amines selective to the extraction of zinc and thereby produce a spent brine and a zinc loaded anionic organic solvent, selectively extracting said zinc from said zinc loaded anionic organic solvent by contacting with water to produce an aqueous solution of zinc chloride, extracting zinc from said aqueous solution of zinc chloride by contacting with a cationic organic solvent selected from the group consisting of mono-(2-ethylhexyl) phosphoric acid, di-(2-ethylhexyl) phosphoric acid, mono-(2l-ethylhexyl) phosphonic acid, di-(2-ethylhexyl) phosphonic acid, di-(2,4,4-trimethyl-pentyl) phosphinic acid and di(2-ethylhexyl) phosphinic acid, to produce a zinc-loaded cationic organic solvent, stripping said zinc from said zinc-loaded cationic organic solvent by contacting with nitric acid to form an aqueous solution of zinc nitrate in a solvent stripping stage, subjecting said zinc nitrate solution to thermal hydrolysis at an elevated temperature ranging from about 150° C. to 300° C. in the presence of pressurized water vapor to produce an acid-forming nitric oxide gas, and decompose zinc nitrate to zinc oxide, recovering said zinc oxide, passing said acid-forming nitric oxide gas to a water scrubber to form nitric acid, and recycling said nitric acid to said solvent stripping stage.

* * * * *

UNITED STATES PATENT AND TRADEMARK OFFICE
CERTIFICATE OF CORRECTION

PATENT NO. : 5,441,712
DATED : August 15, 1995
INVENTOR(S) : Willem P.C. Duyvesteyn et al.

It is certified that error appears in the above-identified patent and that said Letters Patent is hereby corrected as shown below:

Claim 2, column 10, line 30, the expression

"mono-(21-ethylhexyl)" should read

--mono-(2-ethylhexyl--.

Signed and Sealed this

Tenth Day of October, 1995

*Attest:*

BRUCE LEHMAN

*Attesting Officer*     *Commissioner of Patents and Trademarks*